No. 866,707. PATENTED SEPT. 24, 1907.
M. ALTSTOCK.
MECHANISM FOR OPERATING CLUTCHES.
APPLICATION FILED MAR. 17, 1905.

Witnesses:
C. H. Crawford
Ira J. Morgenthal

Inventor:
Marcus Altstock
by B. Singer
Atty

UNITED STATES PATENT OFFICE.

MARCUS ALTSTOCK, OF LEMBERG, AUSTRIA-HUNGARY.

MECHANISM FOR OPERATING CLUTCHES.

No. 866,707.   Specification of Letters Patent.   Patented Sept. 24, 1907.

Application filed March 17, 1905. Serial No. 250,662.

*To all whom it may concern:*

Be it known that I, MARCUS ALTSTOCK, a subject of the Emperor of Austria, and a resident of 14 Turmanska, Lemberg, Galicia, Austria-Hungary, have invented certain new and useful Improvements in Mechanism for Operating Clutches, of which the following is a specification.

This invention relates to improved means for throwing machinery into and out of gear with its prime mover and has for its object the provision of a device of this character adapted for machines wherein the operator is located at some distance from the connection of the prime mover with the machine, the device being also adapted for mechanism where the operator is stationed at different points, its object being to permit the mechanism to be thrown into and out of operative relation from any point at which the operator may be stationed.

The invention will be more fully described in connection with the accompanying drawing and will be more particularly pointed out in and by the appended claims.

Figure 1:
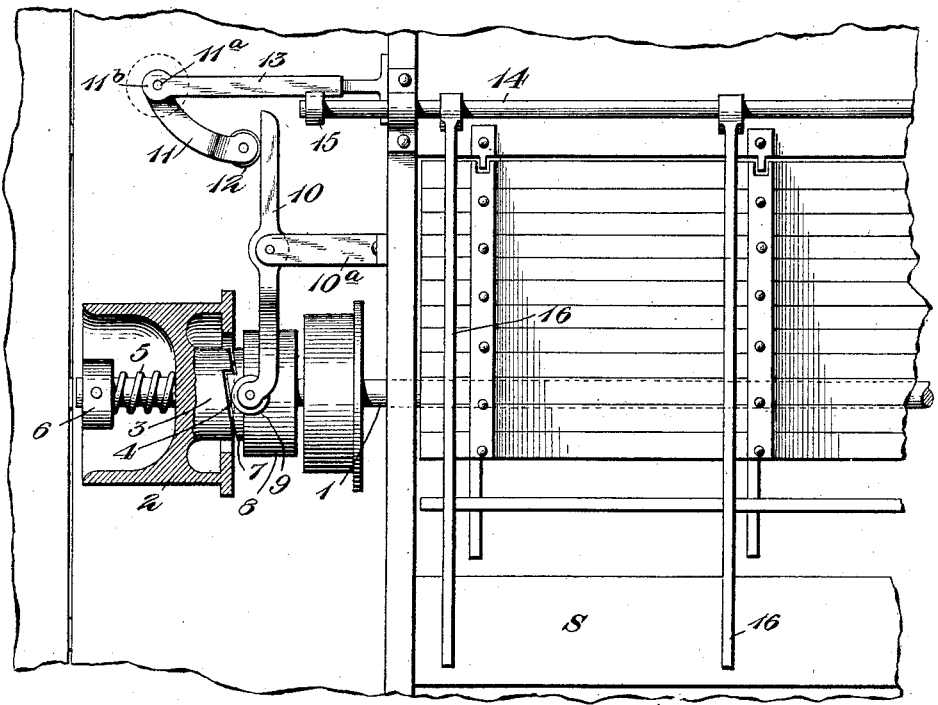
Figure 2:
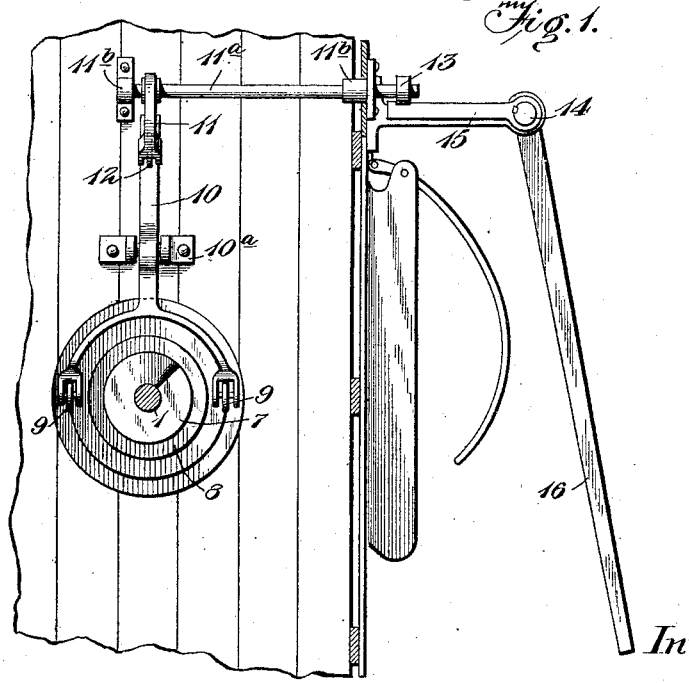

In the drawing: Figure 1 is an end elevation of a portion of a threshing machine showing the device of my invention associated therewith. Fig. 2 is a side elevation of the mechanism shown in Fig. 1 with parts in section.

Like numerals designate similar parts throughout the different figures of the drawing.

As shown, the driven shaft is designated by 1 and carries on its outer end a pulley 2 over which the driving belt is trained. A driven pulley 8 carried by said shaft is adapted to be belted to other mechanisms not shown. Said driving pulley 2 is provided with a hub 3 having formed on its inner face a clutch member 4. The outer pulley 8 is likewise provided with a clutch member 7 adapted to engage the clutch 4. Said pulley 2 is loosely mounted on the driving shaft while the pulleys 8 are rigidly mounted thereon and the pulley 2 is normally held in such position that clutch 4 is engaged with clutch 7 by a yieldingly acting means consisting in the present construction of a spring 5 interposed between the hub 3 and a collar 6. Means are provided for throwing the clutch members 4 and 7 out of operative relation from points remote therefrom and also from any position at which the operator may be stationed, said means consisting, as shown, of the following parts. A lever 10 bifurcated at one end is pivotally mounted to a bracket 10ª and is provided on its lower bifurcated ends with rollers 9 adapted to engage the inner face of the pulley 2. The upper end of said lever 10 projects into the path of and is adapted to be engaged by an arm 11 mounted upon a rock shaft 11ª, said arm carrying a roller 12 for reducing friction of said engagement. Rock shaft 11ª is mounted in bearings 11ᵇ and carries on its outer end an arm 13. Said arm 13 is adapted to be engaged by an arm 15 disposed at right angles thereto and mounted upon a rock shaft 14. Said shaft 14 is disposed in convenient proximity to the various points at which the operator is or may be stationed, the said shaft being of relatively extensive length. In order to facilitate operation of said shaft the same carries a plurality of operating levers 16 spaced apart throughout the length of said shaft and rigidly mounted thereto affording the operator convenient means for disengaging the machine from its driving mechanism at any point at which he may be stationed.

What I claim is:

1. In a device of the class described the combination of a driven shaft, a driving belt pulley loosely mounted on said shaft and provided with a clutch member, a driven pulley rigidly mounted on said shaft and provided with a clutch member, a spring normally holding said clutch members engaged, a pivotally mounted bifurcated lever provided with rollers adapted to engage the loose pulley to disengage said clutch members, a rock shaft, an arm pivotally mounted on said shaft and provided with a roller for engaging said lever, a second arm mounted on said rock shaft, and an operating rock shaft provided with a plurality of operating levers and an operating arm for engagement with said second arm.

2. In a device of the class described the combination with a driven shaft, a loosely mounted clutch therefor, a coöperating driven clutch member nonrotatably mounted on said shaft, means normally engaging said clutch members, a lever adapted to disengage said clutch members, a rock shaft, an arm pivotally mounted on said shaft and adapted to engage said lever, a second arm mounted on said rock shaft, an operating rock shaft provided with a plurality of operating levers and an operating arm for engagement with said second arm.

In testimony whereof I affix my signature in presence of two witnesses.

MARCUS ALTSTOCK.

Witnesses:
ALVESTO S. HOGUE,
IGNAZ KNÖGFELMACHLE.